United States Patent
Eo et al.

(10) Patent No.: US 9,788,275 B2
(45) Date of Patent: Oct. 10, 2017

(54) METHOD FOR REDUCING CURRENT CONSUMPTION AND ELECTRONIC DEVICE THEREOF

(71) Applicant: Samsung Electronics Co., Ltd., Gyeonggi-do (KR)

(72) Inventors: Min-Sung Eo, Gyeonggi-do (KR); Myung-Reun Hyun, Gyeonggi-do (KR); Byeong-Woo Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 199 days.

(21) Appl. No.: 14/469,300

(22) Filed: Aug. 26, 2014

(65) Prior Publication Data
US 2015/0057052 A1 Feb. 26, 2015

(30) Foreign Application Priority Data

Aug. 26, 2013 (KR) .................. 10-2013-0101344
Feb. 28, 2014 (KR) .................. 10-2014-0024400

(51) Int. Cl.
*H04W 52/02* (2009.01)

(52) U.S. Cl.
CPC ... *H04W 52/0251* (2013.01); *H04W 52/0216* (2013.01); *H04W 52/0229* (2013.01); *Y02B 60/50* (2013.01)

(58) Field of Classification Search
CPC ......... H04W 52/0251; H04W 52/0225; H04W 52/0261
See application file for complete search history.

(56) References Cited

U.S. PATENT DOCUMENTS

| | | | | |
|---|---|---|---|---|
| 9,008,629 B1* | 4/2015 | Masterman | ....... | H04W 52/0251 379/207.03 |
| 2007/0127425 A1* | 6/2007 | Keidar | ............. | H04W 52/0229 370/338 |
| 2010/0290380 A1* | 11/2010 | Tsai | ................. | H04W 52/0251 370/311 |
| 2010/0322126 A1* | 12/2010 | Krishnaswamy | ..... | H04W 48/16 370/311 |
| 2011/0264941 A1* | 10/2011 | Park | ...................... | G06F 1/3203 713/324 |
| 2013/0252674 A1* | 9/2013 | Hsieh | ................ | H04W 52/0251 455/566 |
| 2016/0209907 A1* | 7/2016 | Han | ......................... | G06F 1/32 |

* cited by examiner

*Primary Examiner* — Wesley Kim
*Assistant Examiner* — Dong-Chang Shiue
(74) *Attorney, Agent, or Firm* — The Farrell Law Firm, P.C.

(57) ABSTRACT

A method of and device for reducing current consumption is provided. The method includes providing, by a first processor to a second processor, information indicating a state of a display of the electronic device or a display of an external electronic device configured to communicate with the electronic device; receiving, by the second processor, data external to the electronic device; and determining, by the second processor, whether to transmit the data or a result of processing the data to the first processor based on at least a part of the information.

18 Claims, 7 Drawing Sheets

METHOD FOR REDUCING CURRENT CONSUMPTION AND ELECTRONIC DEVICE THEREOF

PRIORITY

This application claims priority under 35 U.S.C. §119(a) to a Korean Patent Application filed on Aug. 26, 2013 in the Korean Intellectual Property Office and assigned Serial No. 10-2013-0101344, and to a Korean Patent Application filed on Feb. 28, 2014 in the Korean Intellectual Property Office and assigned Serial No. 10-2014-0024400, the contents of which are incorporated herein by reference.

BACKGROUND

1. Field of the Invention

The present disclosure relates generally to a method for reducing current consumption and an electronic device thereof.

2. Description of the Related Art

An electronic device such as a portable terminal shifts among an active mode, a sleep mode, and an idle mode in order to effectively manage power. The electronic device may exchange packets with a base station in the active mode, minimize power consumption in the sleep mode by reducing use of resources during a predetermined time based on a pre-negotiation with the base station, and reduce power consumption in the idle mode by monitoring down-link traffic only.

Most electronic devices include an Application Processor (AP) to perform various functions for the electronic device by executing various software programs, and a communication processor to process and control voice communication and data communication. The communication processor may be referred to as a modem.

The application processor of an electronic device may receive state information from the communication processor (or modem) and process the state information to provide a communication service use state (e.g., an antenna level display, etc.). In this case, the application processor may simply output the state information received from the communication processor without processing the state information or may process the state information through a third application and output the state information. Such an update of the state information of the communication processor may cause an application to operate and, accordingly, may cause a sleep state period to be shortened. Therefore, current consumption increases. That is, the application processor is woken to process an event occurring in the communication processor such as a state information update in the sleep state, and thus current consumption increases.

Therefore, there is a need for a method and apparatus for reducing current consumption in an electronic device which processes an event generated by a communication processor or a modem.

SUMMARY

The present disclosure has been made to address at least the above-mentioned problems and/or disadvantages, and to provide at least the advantages described below. Accordingly, an aspect of the present disclosure is to provide a method and apparatus for reducing current consumption in an electronic device.

In accordance with an aspect of the present disclosure, a method of reducing current consumption in an electronic device is provided. The method includes providing, by a first processor to a second processor, information indicating a state of a display of the electronic device or a display of an external electronic device configured to communicate with the electronic device; receiving, by the second processor, data external to the electronic device; and determining, by the second processor, whether to transmit the data or a result of processing the data to the first processor based on at least a part of the information.

In accordance with another aspect of the present disclosure, a method of reducing current consumption in an electronic device is provided. The method includes providing, by a processor, information related to a state of at least one component of the electronic device to a communication module of the electronic device; receiving, by the communication module, data external to the electronic device; and selectively transmitting, by the communication module, the data or a result of processing the data to the processor, based on at least a part of the information.

In accordance with another aspect of the present disclosure, a device for reducing current consumption in an electronic device is provided. The device includes a display; a first processor; and a second processor, wherein the first processor is configured to provide information indicating a state of the display or a display of an external electronic device which is configured to communicate with the electronic device to the second processor, and wherein the second processor is configured to receive data external to the electronic device and determine whether to transmit the data or a result of processing the data to the first processor or not based on at least a part of the information.

Another aspect of the present disclosure is to provide a method and apparatus for processing an event generated by a modem to reduce current consumption in an electronic device. Another aspect of the present disclosure is to provide a method and apparatus for limiting a number of times that state information update events of a modem are provided to an application processor by filtering the state information update events in a screen off state. Another aspect of the present disclosure is to provide a method and apparatus for retaining a sleep state for a long time by limiting a number of times that state information update events of a modem are provided to an application processor in a screen off state.

BRIEF DESCRIPTION OF THE DRAWINGS

The above and other aspects, features and advantages of the present disclosure will be more apparent from the following detailed description, when taken in conjunction with the accompanying drawings, in which.

DETAILED DESCRIPTION OF EMBODIMENTS OF THE PRESENT INVENTION

Embodiments of the present disclosure are described herein below with reference to the accompanying drawings. In the following description, detailed descriptions of well-known functions or configurations are omitted since they would unnecessarily obscure the subject matter of the present disclosure. Also, the terms used herein are defined according to the functions of the present disclosure. Thus, the terms may vary depending on users' or operators' intentions or practices. Therefore, the terms used herein should be understood based on the descriptions made herein.

Hereinafter, a method and apparatus for reducing current consumption in an electronic device according to various embodiments of the present disclosure are described.

Figure 1:
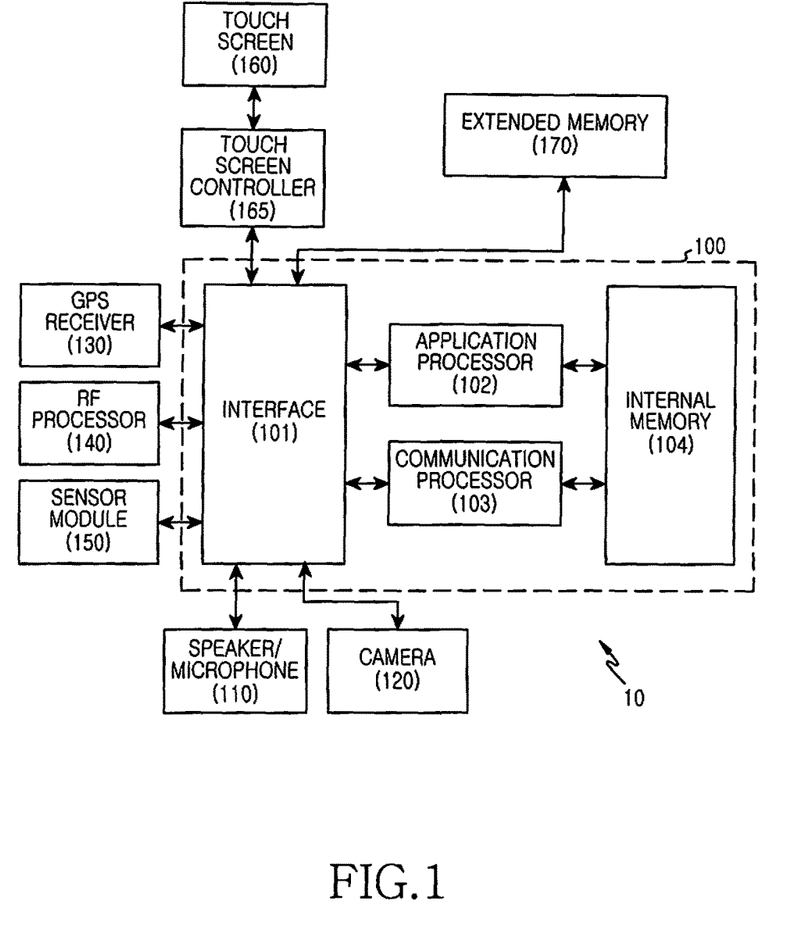
FIG. 1 is a block diagram of an electronic device according to an embodiment of the present disclosure.

FIG. 1 is a block diagram of an electronic device 10 according to an embodiment of the present disclosure.

The electronic device 10 may be a device such as a portable terminal, a mobile terminal, a mobile pad, a media player, a tablet computer, a handheld computer or a Personal Digital Assistant (PDA), a server, a Personal Computer (PC), etc. In addition, the electronic device 10 may be any electronic device including a device combining two or more functions of these devices.

Referring to FIG. 1, the electronic device 10 includes a controller 100, a speaker/microphone 110, a camera 120, a Global Positioning System (GPS) receiver 130, a Radio Frequency (RF) processor 140, a sensor module 150, a touch screen 160, a touch screen controller 165, and an extended memory 170.

The controller 100 includes an interface 101, one or more processors (e.g., an application processor 102, a communication processor 103), and an internal memory 104. According to the circumstances, the controller 100 may be referred to as a processor. The interface 101, the application processor 102, the communicator processor 103, and the internal memory 104 may be separate elements or may be integrated into one or more integrated circuits.

The application processor 102 performs various functions for the electronic device 10 by executing various software programs, and the communication processor 103 processes and controls voice communication and data communication. In addition to these typical functions, the application processor 102 and the communication processor 103 may execute a software module (e.g. an instruction set) stored in the extended memory 170 or the internal memory 104 and may perform various functions corresponding to the software module. That is, the application processor 102 and the communication processor 103 may perform a method of reducing current consumption in the electronic device 10 according to an embodiment of the present disclosure by interworking with software modules stored in the extended memory 170 or the internal memory 104.

For example, the application processor 102 may provide screen state information (e.g. screen on/off information) to the communication processor 103 so that the communication processor 103 can filter events, and may receive state information of the communication processor 103 from the communication processor 103 and update the state information.

Another processor (not shown) may include one or more of a data processor, an image processor, a sensor processor, or a CODEC. The data processor, the image processor, or the CODEC may be separate elements. In addition, the processor may include a plurality of processors which perform different functions. The interface 101 is connected to the touch screen controller 165 and the extended memory 170 of the electronic device 10.

The interface 101 may be a bus for connecting at least one processor and peripherals.

The sensor module 150 is coupled to the interface 101 to enable various functions. For example, a motion sensor and an optical sensor may be coupled to the interface 101 to respectively enable motion sensing and external light-beam sensing. In addition thereto, other sensors such as a location measurement system, a temperature sensor, a biometric sensor, or the like may be coupled to the interface 101 to perform related functions.

Output data of the sensor module 150 is transmitted to the application processor 102 or the communication processor 103 via the interface 101 or may be pre-processed by a processor such as a sensor processor via the interface 101 and then a result of the processing may be provided to the application processor 102 or the communication processor 103.

The camera module 102 is coupled to the sensor module 150 via the interface 101 to perform a camera function such as photographing and video clip recording.

The RF processor 140 performs a communication function. For example, the RF processor 140 converts an RF signal into a baseband signal under the control of the communication processor 103, and then provides the baseband signal to the communication processor 103, or converts a baseband signal from the communication processor 103 into an RF signal and transmits the RF signal. Herein, the communication processor 103 processes the baseband signal in various communication schemes. For example, although not limited thereto, the communication scheme may include a Global System for Mobile Communication (GSM) communication scheme, an Enhanced Data GSM Environment (EDGE) communication scheme, a Code Division Multiple Access (CDMA) communication scheme, a W-Code Division Multiple Access (WCDMA) communication scheme, a Long Term Evolution (LTE) communication scheme, an Orthogonal Frequency Division Multiple Access (OFDMA) communication scheme, a Wireless Fidelity (Wi-Fi) communication scheme, a WiMax communication scheme, and/or a Bluetooth communication scheme.

In addition to the various embodiments of the present disclosure, the communication processor 103 identifies a screen state of the electronic device 10 if a modem information update event occurs, and determines whether it is necessary to update modem information corresponding to the event in a screen-off state. For example, the communication processor 103 may determine whether it is necessary to update the modem information if an event in which a network registration state changes from a registered state to a deregistered, or unregistered, state or changes from a deregistered state to a registered state occurs, if an event occurs in which Radio Access Technology (RAT) information is changed while a tethering function is performed, or if a time zone of Network Identity and Time Zone (NITZ) information is different from a previous time zone. In a screen-on state, the communication processor 103 may not filter the modem information event in a corresponding mode and may update the modem information by awaking the application processor 102 for all events if necessary.

If it is determined that it is necessary to update the modem information corresponding to an event, the communication processor 103 wakes up the application processor 102 and provides state information corresponding to the modem information update event to the application processor 102. If it is determined that it is not necessary to update the modem information corresponding to the event, the communication processor 103 disregards the modem information update event, that is, does not wake up the application processor 102 from the sleep state and does not provide the state information corresponding to the modem information update event to the application processor 102.

The communication processor 102 may be replaced by a communication module which includes devices for communicating with one or more processors or a communication module which includes only the devices for communicating without a processor.

The speaker/microphone 110 inputs and outputs an audio stream such as voice recognition, voice reproduction, digital recording, and telephony functions. That is, the speaker/microphone 110 converts an audio signal into an electrical signal or converts an electrical signal into an audio signal. An attachable and detachable ear phone, headphone, or headset may be connected to the electronic device 10 via an external port.

The touch screen controller 165 is coupled to the touch screen 160. Although not limited thereto, the touch screen 160 and the touch screen controller 165 may use not only capacitance, resistance, infrared and surface sound wave techniques for determining one or more contact points but also any multi-touch sense technique including other proximity sensor arrays or other elements to detect a contact, a movement, or stopping thereof.

The touch screen 160 provides an input/output interface between the electronic device 10 and the user. That is, the touch screen 160 delivers a touch input of the user to the electronic device 10. In addition, the touch screen 160 is a medium which shows an output from the electronic device 10 to the user. That is, the touch screen shows a visual output to the user. Such a visual output is represented in the form of a text, a graphic, a video, and a combination thereof.

A variety of displays may be used as the touch screen 160. For example, although not limited thereto, the touch screen 160 may use a Liquid Crystal Display (LCD), a Light Emitting Diode (LED), a Light Emitting Polymer Display (LPD), an Organic Light Emitting Diode (OLED), an Active Matrix Organic Light Emitting Diode (AMOLED), or a Flexible LED (FLED).

The GPS receiver 130 converts a signal received from a satellite into information of a location, a speed, a time, etc. For example, a distance between the satellite and the GPS receiver is calculated by multiplying a speed of light by a signal arrival time, and a location of the electronic device 10 is measured according to a well-known principle of triangulation by obtaining a distance and a correct location of three satellites.

The extended memory 170 or the internal memory 103 may include one or more fast Random Access Memories (RAMs) and/or a non-volatile memory such as a magnetic disc storage device, one or more optical storage devices and/or a flash memory (e.g., NAND, NOR).

The extended memory 170 or the internal memory 103 stores a software component. The software component includes an operating system software module, a communication software module, a graphic software module, a user interface software module, a Moving Picture Experts Group (MPEG) module, a camera software module, one or more application software modules, etc. In addition, since a module, i.e., a software component, can be expressed as a group of instructions, the module may also be expressed as an instruction set. The module may also be expressed as a program.

The operating system software includes various software components for controlling a general system operation. The control of the general system operation includes memory management and control, storage hardware (e.g. device) control and management, power control and management, etc. In addition, the operating system software performs a function for facilitating communication between various hardware elements (e.g. devices) and software elements (e.g. modules).

The communication software module enables communication with other electronic devices such as a computer, a server, and/or a portable terminal via the RF processor 140. Furthermore, the communication software module includes a protocol structure conforming to a corresponding communication scheme.

Regarding the present disclosure, the communication software module may include instructions (see FIGS. 1 to 5) for reducing current consumption in an electronic device 10.

The graphic software module includes various software components for providing and displaying graphics on the touch screen 160. The terminology of "graphics" indicates a text, a web page, an icon, a digital image, a video, an animation, etc.

The user interface software module includes various software components related to a user interface. The user interface software module includes the content related to how a state of the user interface changes and in which condition the state of the user interface changes.

The camera software module includes a camera-related software component which enables camera-related processes and functions. The application module includes a web browser including a rendering engine, an e-mail application, an instant message application, word processing, keyboard emulation, an address book, a touch list, a widget, a Digital Rights Management (DRM), voice recognition, voice reproduction, a position determining function, a location-based service, etc. The extended memory 170 and the internal memory 104 may further include additional modules (e.g. instructions) in addition to the aforementioned modules. Alternatively, optionally, some of the modules (e.g. instructions) may not be used.

Figure 2:
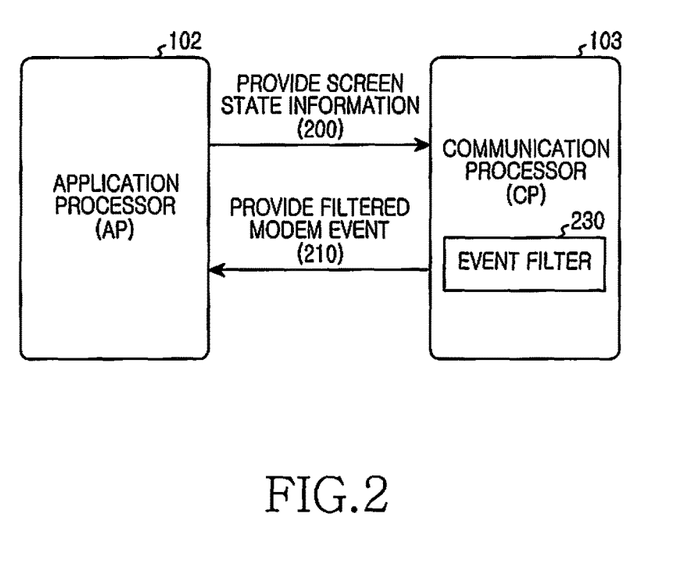
FIG. 2 is a block diagram for processing a state information update event of a modem in an electronic device according to an embodiment of the present disclosure.

FIG. 2 is a block diagram for processing a state information update event of a modem in an electronic device 10 according to an embodiment of the present disclosure.

Referring to FIG. 2, if a modem information update event (e.g., an antenna level display, an RAT display (e.g., Third Generation (3G), Fourth Generation (4G), network registration state, etc.)) occurs, the communication processor 103 wakes up the application processor 102 and provides information corresponding to the modem information update event.

However, waking up the application processor 102 every time the modem information update event occurs may cause a sleep period of the application processor 102 to be shortened and thus cause current consumption to increase.

There is a limit to restricting the communication processor 103 or modem from being awoken to perform or retain the communication function to reduce current consumption, but the modem waking up the application processor 102 from the sleep state to update the state information can be restricted. That is, an event filter 230 of the communication processor 103 can reduce a number of times that the application processor in the sleep state is woken up by restricting a kind of information to be updated from the modem.

The NITZ information is local standard time information which, if the electronic device moves to another local time zone, is acquired from a corresponding local base station. According to the NITZ information, the electronic device may adjust a standard time.

Since the screen-off state refers to a user standby state except for a special case (e.g. an event causing a state asynchronous, or async, error), it is not necessary to always update all the information of the modem in the screen-off state.

According to an embodiment of the present disclosure, the communication processor 103 receives screen state information 200 from the application processor 102, filters information related to the state async error, and provides the filtered modem event information 210 to the application processor 102 to update the modem information.

Information on the event to be filtered may be stored in the extended memory 170 or the internal memory 104 of FIG. 1 and may be updated via a network.

Referring to FIG. 2, first, only if the network registration state changes from the registered state to the deregistered state or changes from the deregistered state to the registered state, the communication processor 103 wakes up the application processor 102 and provides the network registration state information, and, if the network registration state does not change from the registered state to the deregistered state or does not change from the deregistered state to the registered state, the communication processor 103 does not provide the event to the application processor 102. In other words, the communication processor 103 does not wake up the application processor 102.

The information on the network registration state may include a base station or network area code (e.g., a cell identification, a Location Area Code (LAC), a Routing Area Code (RAC), a Tracking Area Code (TAC)), a roaming status, a forbidden Boolean indicating registrability or unregistrability, Radio Access Technology (RAT) information which can be handed over, a service domain, service capability, Public Land Mobile Network (PLMN) information, etc.

In addition, if a RAT information (LTE, WCDMA, GSM) change event occurs and a tethering function is performed, the communication processor 103 wakes up the application processor 102 and provides the RAT information. However, the communication processor 103 does not wake up the application processor 102 if the tethering function is not performed. That is, the communication processor 103 does not provide the RAT information to the application processor 102.

Finally, if an NITZ information reception event occurs, the communication processor 103 wakes up the application processor 102 and provides the NITZ information only at the early stage, and then does not wake up the application processor 102 during a predetermined time even if the NITZ information is received. In other words, the communication processor 103 prevents the NITZ information from being updated within a predetermined time after the NITZ information was updated.

According to an embodiment of the present disclosure, if a time zone of the NITZ information is the same as previously stored time zone information, the communication processor 130 does not update the NITZ information, and, if the time zone is different from the previous time zone information, the communication processor 130 awakens the application processor 102 and provides the NITZ information.

In the case of the network registration state and the RAT information, if information is not updated during a predetermined time, the information may be updated at regular intervals and thus an abrupt state change may be prevented.

As described above, it is possible to prevent a state async error by selectively updating the modem information, and to reduce the number of times that the application processor 102 is woken up by actively filtering information in the modem.

Figure 3:
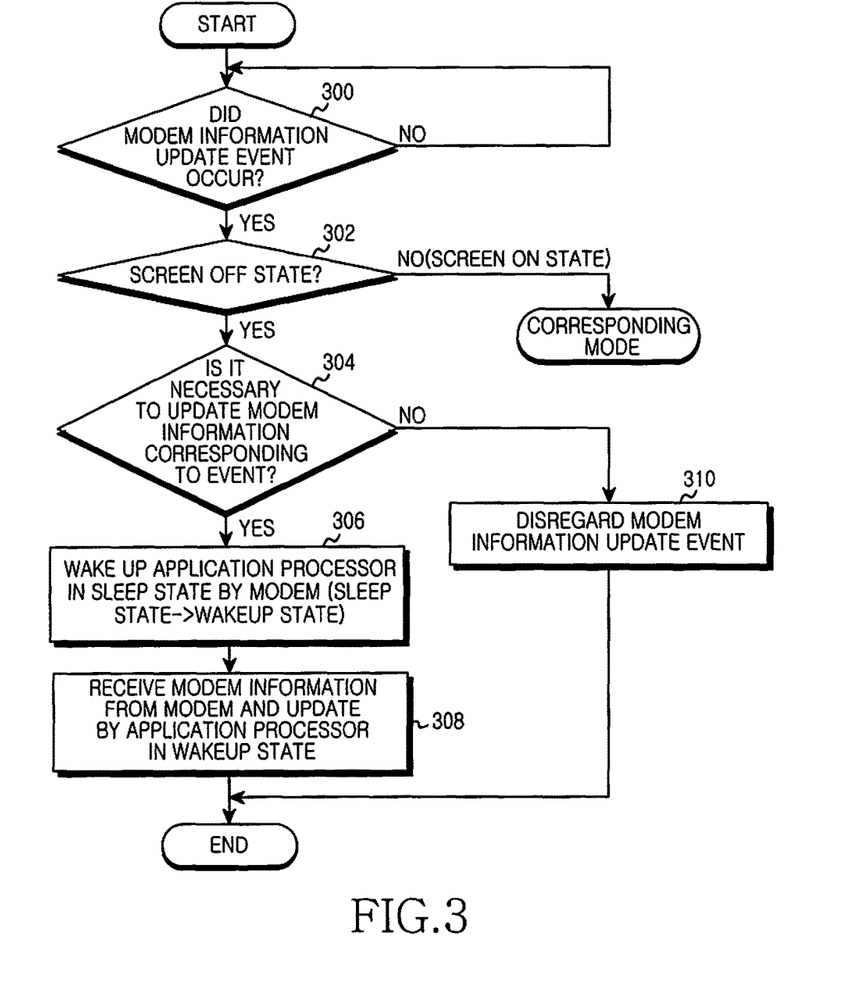
FIG. 3 is a flowchart of a method of reducing current consumption in an electronic device according to an embodiment of the present disclosure.

FIG. 3 is a flowchart of a method of reducing current consumption in an electronic device according to an embodiment of the present disclosure.

Referring to FIG. 3, if a modem information update event occurs in step 300, the communication processor 103 of the electronic device proceeds to step 302 to identify a screen state of the electronic device. The screen state information of the electronic device may be collected by the application processor 102 and the collected information may be transmitted from the application processor 102 to the communication processor 103 at regular intervals, according to an event, or according to a request of the communication processor 103. Alternatively, the communication processor 103 may directly access the internal memory 104 and the extended memory 170 in which the collected information is stored and acquire the information. The modem information update event may occur if network registration state information (e.g. base station), RAT information, and NITZ information are changed. In addition, the communication processor 103 may determine whether the screen state is a screen-off state by using the screen state information provided from the application processor 102.

Thereafter, if the screen state is in the screen-off state in step 302, the communication processor 103 proceeds to step 304 to determine whether it is necessary to update modem information corresponding to the event. For example, if an event in which the network registration state changes from the registered state to the deregistered state or changes from the deregistered state to the registered state occurs, if an event in which RAT information is changed while a tethering function is performed occurs, or if a time zone of the NITZ information is different from a previous time zone, it is determined whether it is necessary to update the modem information. A detailed description of this is described below with reference to FIG. 4.

If the screen state is a screen-on state in step 302, the communication processor 103 performs a corresponding mode. For example, the communication processor 103 does not filter the modem information event in the corresponding mode and wakes up the application processor 102 from the sleep state for every event if necessary and updates the modem information.

If it is determined that it is necessary to update the modem information corresponding to the event in step 304, the communication processor 103 wakes up the application processor 102 from the sleep state in step 306 and provides state information corresponding to the modem information update event to the application processor 102 in step 308.

If it is determined that it is not necessary to update the modem information corresponding to the event in step 304, the communication processor 103 proceeds to step 310 to disregard the modem information update event. In other words, the communication processor 103 does not wake up the application processor 102 from the sleep state and does not provide the state information corresponding to the modem information update event to the application processor 102.

As described above, the communication processor 103 selectively interrupts the modem information update event without causing information loss, rather than waking up the application processor 102 and processing the modem state information for every modem information update event in the screen-off state, so that the number of times that the application processors 102 is woken up is reduced without information loss.

Figure 4:
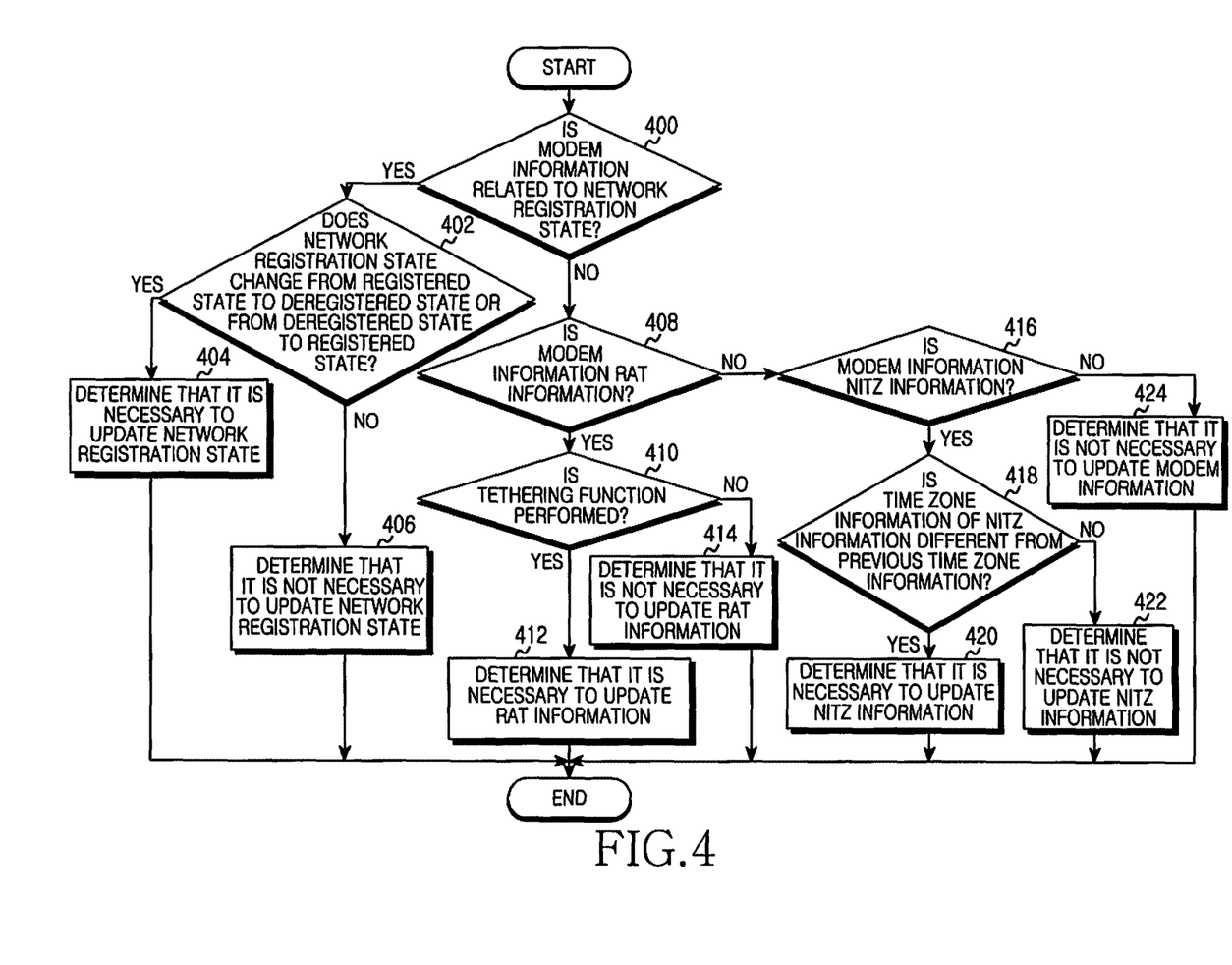
FIG. 4 is a flowchart of a method of processing a state information update event of a modem in an electronic device according to an embodiment of the present disclosure.

FIG. 4 is a flowchart of a method of processing a state information update event of a modem in an electronic device according to an embodiment of the present disclosure.

Referring to FIG. 4, the communication processor 103 determines whether modem information is related to a network registration state in step 400. If the modem information is related to the network registration state, the communication processor 103 determines whether the network registration state changes from the registered state to the deregistered state or changes from the deregistered state to the registered state in step 402. If the network registration state changes from the registered state to the deregistered state or from the deregistered state to the registered state, the communication processor 103 determines that it is necessary to update the network registration state in step 404, and, if a low service level indicating that the network registration state does not change from the registered state to the deregistered state or does not change from the deregistered state to the registered state changes, the communication processor 103 determines that it is not necessary to update the network registration state.

The communication processor 103 determines whether the modem information is RAT information in step 408. If the modem information is the RAT information, the communication processor 103 proceeds to step 410 to determine whether the electronic device is connected to other electronic devices and performs a tethering function or not. If the electronic device is connected to other electronic devices and performs the tethering function, the communication processor 130 proceeds to step 412 to determine that it is necessary to update the RAT information, and, if the electronic device does not perform the tethering function, the communication processor 130 proceeds to step 414 to determine that it is not necessary to update the RAT information.

The communication processor 103 determines whether the modem information is NITZ information in step 416. If the modem information is the NITZ information, the communication processor 103 proceeds to step 418 to determine whether a time zone of the NITZ information is different from a previously stored time zone. If the time zone of the NITZ information is different from the previously stored time zone, the communication processor 103 proceeds to step 420 to determine that it is necessary to update the NITZ information, and, if the time zone of the NITZ information is the same as the previously stored time zone, the communication processor 103 proceeds to step 422 to determine that it is not necessary to update the NITZ information.

On the other hand, if the modem information is neither the network registration state, RAT information, nor the NITZ information, the communication processor 103 proceeds to step 424 to determine that it is not necessary to update the modem information.

Figure 5:
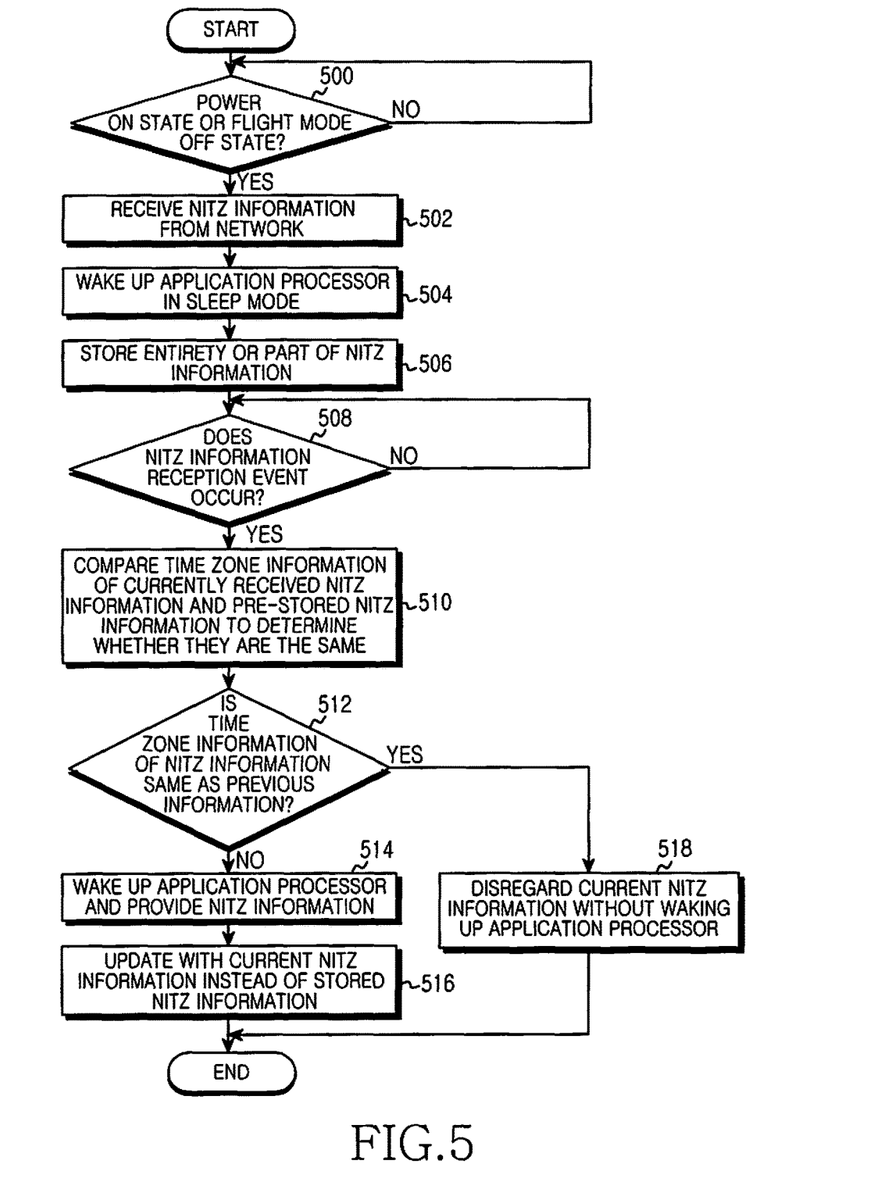
FIG. 5 is a flowchart of a method of reducing current consumption in an electronic device according to an embodiment of the present disclosure.

FIG. 5 is a flowchart of a method of reducing current consumption in an electronic device according to an embodiment of the present disclosure.

Referring to FIG. 5, if the electronic device is in a power-on state or a flight-mode-off state in step 500, the communication processor 103 proceeds to step 502 to receive NITZ information from a network, and wakes up the application processor 102 from the sleep mode in step 504, and provides the NITZ information to the application processor 102 and stores an entirety or a part of the NITZ information (e.g., time zone information) in step 506. If the application processor 102 is in a wakeup state rather than in the sleep state, step 504 may be omitted.

Thereafter, if the application processor 102 shifts to the sleep state and is in the screen-off state, the communication processor 103 determines whether an NITZ information reception event occurs in step 508. If the NITZ information reception event occurs, the communication processor 102 proceeds to step 510 to compare time zone information of the NITZ information and previously stored time zone information to determine whether they are the same.

If the time zone information of the NITZ information is different from the previously stored time zone information in step 512, the communication processor 103 proceeds to step 514 to wake up the application processor 102 and provide the NITZ information.

Thereafter, the application processor 102 updates the NITZ information by driving a corresponding application in step 516.

On the other hand, if the time zone information of the NITZ information is the same as the previously stored time zone information in step 512, the communication processor 103 proceeds to step 518 to not wake up the application processor and to disregard the currently received NITZ information.

Figure 6:
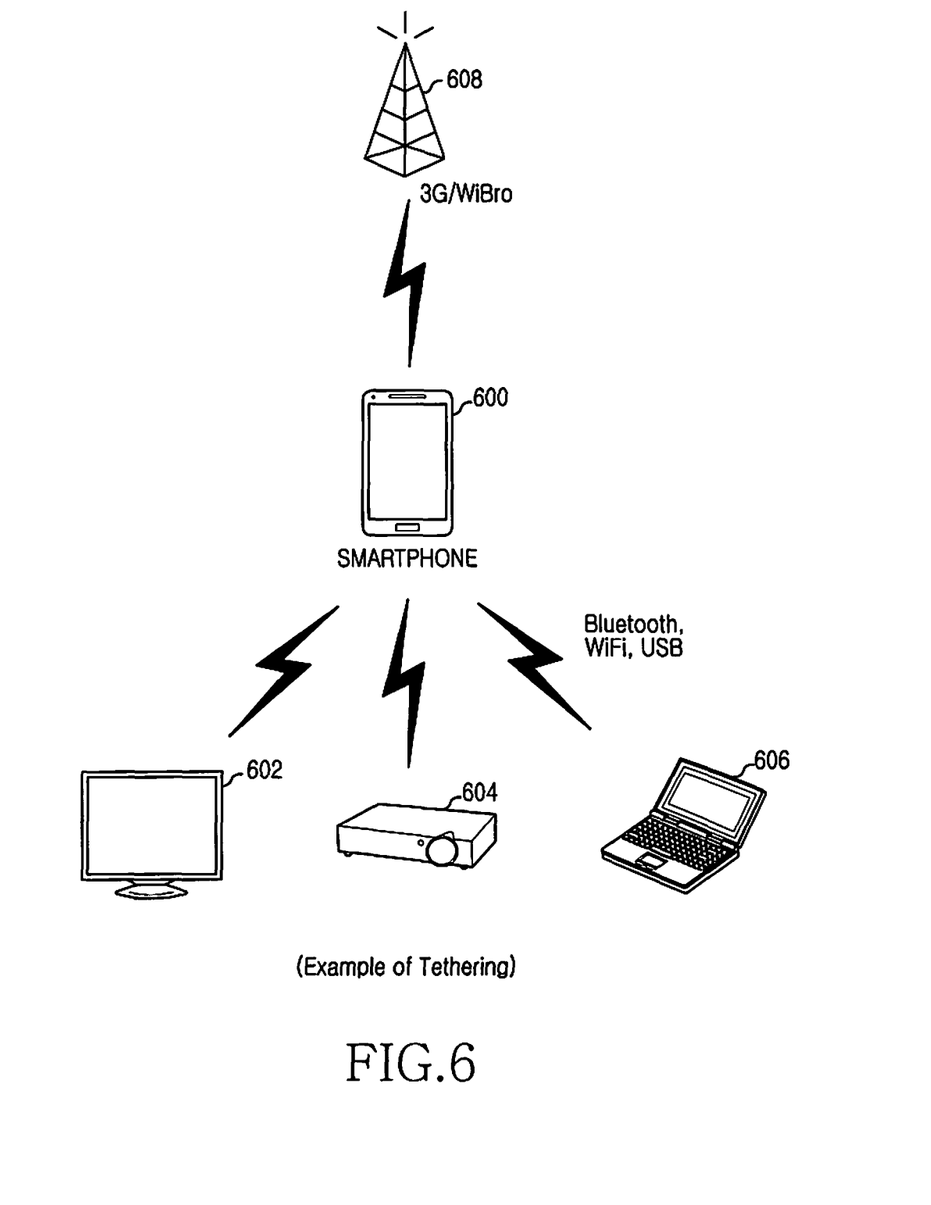
FIG. 6 is an illustration of a tethering function according to an embodiment of the present disclosure.

FIG. 6 is an illustration of a tethering function according to an embodiment of the present disclosure.

Referring to FIG. 6, tethering refers to a service which enables an electronic device connected to the Internet to serve as a router itself and thus to allow other neighboring devices to connect to the Internet. The tethering may use Bluetooth, a USB cable connection, a wireless Local Area Network (LAN), etc. according to a scheme. The user can use the Internet service by connecting a notebook computer to a portable terminal.

For example, a smartphone 600 is connected to a base station 608 to be able to connect to the Internet based on a 3G or 4G communication scheme. In this case, other devices 602, 604, and 606 are connected to the smartphone 600 via Bluetooth, a USB cable connection, or a wireless LAN to be able to connect to the Internet.

If a modem information event, e.g., an RAT change event, occurs while the tethering function is performed in the smartphone 600, a communication processor of the smartphone 600 wakes up an application processor and provides RAT change information to update modem information.

Figure 7:
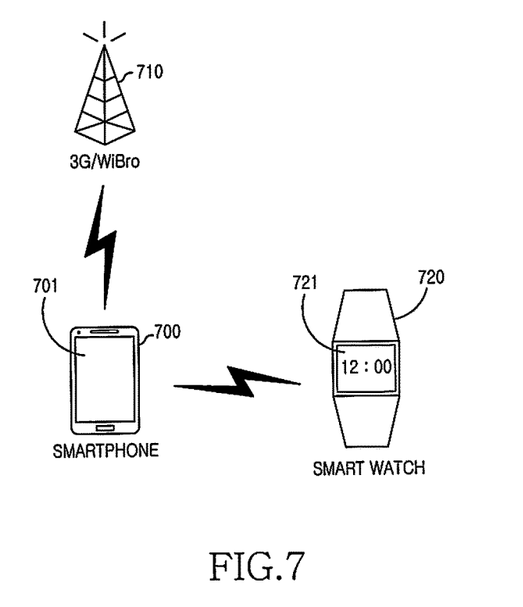
FIG. 7 is an illustration of a screen outside of an electronic device according to an embodiment of the present disclosure.

FIG. 7 is an illustration of a screen outside of an electronic device according to an embodiment of the present disclosure.

Referring to FIG. 7, a screen exists on an outside of an electronic device 700 and may be a screen 721 of an external device 720. The external screen 721 or the external device 720 is connected to the electronic device 700 in a wired or wireless manner.

For example, the external screen 721 or the external device 720 may be a display device such as a monitor or a TV, a wearable device such as smart glasses or a smart watch, or various devices such as a laptop, a tablet, or a smartphone.

According to an embodiment of the present information, the electronic device 700 may or may not include the screen 701 therein. The electronic device 700 determines whether to update modem information received from an external source 710 according to at least one piece of state information of the internal screen 701 or the external screen 721, and disregards the modem information update event if it is not necessary to update the modem information. If it is necessary to update the modem information, the communication processor 103 provides the modem information to at least one of the application processor 102, the external device 720 such as a smart watch, and the external screen 721.

In addition, the screen state information may be hardware or software state information of the electronic device 700 or the external device 720.

For example, state information of a microphone, a speaker, an LED, a vibrator, a sensor, etc. may be used in addition to the screen state, and state information of an operating system or an application may be used.

In addition the selectively processed modem information update event may be extended to data which is transmitted from the external device 720 connected to the electronic device 700 in a wired or wireless manner to the electronic device 700, and the processor which operates may vary according to external data.

For example, if the electronic device 700 includes a sensor processor to process sensor data, the sensor processor receives data from the sensor module 150, determines whether it is necessary to update according to the screen state information of the electronic device 700, and determines whether to transmit the sensor data or information related to the sensor data to other processors (e.g., application processor 102, communication processor 103) or the external device 720.

The present disclosure may be implemented in hardware, software, or a combination of both.

If implemented in software, a non-transitory computer-readable recording medium for storing one or more programs (i.e., software modules) can be provided. The one or more programs stored in the non-transitory computer-readable recording medium are configured for execution performed by one or more processors in an electronic device. The one or more programs include instructions for allowing the electronic device to execute the methods based on the embodiments disclosed in the claims and/or specification of the present disclosure.

The program (i.e., the software module or software) maybe stored in a Random Access Memory (RAM), a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program can be stored in an attachable storage device capable of accessing the electronic device through a communication network such as the Internet, an Intranet, a Local Area Network (LAN), a Wide LAN (WLAN), a Storage Area Network (SAN), or a communication network configured by combining the networks. The storage device can access the electronic device via an external port.

In addition, a storage device on a communication network may access a portable electronic device.

As described above, the electronic device restricts the number of times the modem information is provided to the application processor by filtering the state information update event of the modem in the screen-off state, so that the number of times the application processor is woken up is reduced and, hence, the current consumption in the electronic device is reduced.

While the present disclosure has been shown and described with reference to certain embodiments thereof, it will be understood by those skilled in the art that various changes and modification in form and details may be made therein without departing from the spirit and scope of the present disclosure as defined by the appended claims and their equivalents.

What is claimed is:

1. A method of reducing current consumption in an electronic device, the method comprising:
when a first processor is in a sleep state, receiving, by a second processor, external data related to an external electronic device configured to communicate with the electronic device;
checking, by the second processor, information indicating a state of a display of the external electronic device; and
determining, by the second processor, whether to transmit the external data or a result of processing the external data to the first processor based on at least a part of the checked information,
wherein determining, by the second processor, whether to transmit the external data or the result of processing the external data comprises:
if the display of the external electronic device is in an on-state, waking up, by the second processor, the first processor from the sleep state and transmitting the external data or the result of processing the external data to the awakened first processor;
if the display of the external electronic device is in an off-state, determining, by the second processor, an update of modem information corresponding to the external data is necessary;
if the update of modem information is necessary, waking up, by the second processor, the first processor from the sleep state and transmitting the external data or the result of processing the external data to the awakened first processor; and
if the update of modem information is not necessary, disregarding, by the second processor, the update of modem information corresponding to the external data so that the sleep state of the first processor is maintained,
wherein the modem information comprises at least one of a change of a network registration state and a change of Radio Access Technology (RAT) information while a tethering function is performed.

2. The method of claim 1, wherein the first processor comprises an application processor, and the second processor comprises a communication processor.

3. The method of claim 1, further comprising providing, by the first processor to the second processor, information indicating the state of the display or a change in the state of the display.

4. The method of claim 3, wherein providing the information indicating the change in the state of the display comprises, providing at least one piece of information indicating that the display changes from the on-state to the off-state or information indicating that the display changes from the off-state to the on-state.

5. The method of claim 1, wherein receiving, by the second processor, the external data to the electronic device comprises receiving data related to external communication of the electronic device.

6. The method of claim 1, wherein determining, by the second processor, whether to transmit the external data or the result of processing the external data to the first processor comprises, determining to transmit the external data or the result of processing the external data if the external data or the result of processing the external data is related to the network registration state.

7. The method of claim 1, wherein determining, by the second processor, whether to transmit the external data or the result of processing the external data to the first processor comprises, determining to transmit the external data or the result of processing the external data if the external data or the result of processing the external data is related to the RAT information.

8. The method of claim 1, wherein determining, by the second processor, whether to transmit the external data or the result of processing the external data to the first processor comprises, determining to transmit the external data or the result of processing the external data if the external data or the result of processing the external data is related to Network Identity and Time Zone information.

9. A method of reducing current consumption in an electronic device, the method comprising:
providing, by a processor, information related to a state of at least one component of an external electronic device configured to communicate with the electronic device to a communication module of the electronic device;
receiving, by the communication module, external data related to the external electronic device when the processor is in a sleep state; and
selectively transmitting, by the communication module, the external data or a result of processing the external data to the processor, based on at least a part of the provided information,
wherein selectively transmitting, by the communication module, the external data or a result of processing the external data comprises:
if the state of the at least one component is a first state, waking up, by the communication module, the processor from the sleep state and transmitting the external data or the result of processing the external data to the awakened processor;
if the state of the at least one component is a second state, determining, by the communication module, an update of modem information is necessary;
if the update is necessary, waking up, by the communication module, the processor from the sleep state and transmitting the external data or the result of processing the external data to the awakened processor; and
if the update is not necessary, disregarding, by the communication module, the update of modem information so that the sleep state of the processor is maintained,
wherein the modem information comprises at least one of a change of a network registration state and a change of Radio Access Technology (RAT) information while a tethering function is performed.

10. The method of claim 9, wherein the processor comprises an application processor, and the components comprise one or more of a display, a microphone, a speaker, a Light Emitting Diode (LED), a vibrator, and a sensor.

11. The method of claim 9, wherein selectively transmitting, by the communication module, the external data or a result of processing the external data to the processor comprises, if the external data or the result of processing the external data is related to the network registration state, the RAT information, or Network Identity and Time Zone (NITZ) information, transmitting at least one of the external data or the result of processing the external data to the processor.

12. The method of claim 9, wherein selectively transmitting, by the communication module, the external data or the result of processing the external data to the processor comprises outputting the external data or the result of processing the external data via the component of the external electronic device based on at least a part of the external data or the information related to the external data or the result of processing the external data.

13. An electronic device for reducing current consumption, comprising:
a display;
a first processor; and
a second processor,
wherein the second processor is configured to:
receive external data related to an external electronic device configured to communicate with the electronic device when the first processor is in a sleep state;
check information indicating a state of a display of the external electronic device;
if the display of the external electronic device is in an on-state, wake up the first processor from the sleep state and transmit the external data or the result of processing the external data to the awakened first processor;
if the display of the external electronic device is in an off-state, determine an update of modem information corresponding to the external data is necessary;
if the update of modem information is necessary, wake up the first processor from the sleep state and transmit the external data or the result of processing the external data to the awakened first processor; and
if the update of modem information is not necessary, disregard the update of modem information corresponding to the external data so that the sleep state of the first processor is maintained,
wherein the modem information comprises at least one of a change of a network registration state and a change of Radio Access Technology (RAT) information while a tethering function is performed.

14. The electronic device of claim 13, wherein the first processor comprises an application processor, and the second processor comprises a communication processor.

15. The electronic device of claim 13, wherein the first processor transmits information indicating a change in the state of the display to the second processor.

16. The electronic device of claim 13, wherein the first processor transmits at least one piece of information indicating that the display changes from the on-state to the off-state or from the off-state to the on-state.

17. The electronic device of claim 13, wherein the second processor receives data related to external communication of the electronic device.

18. The electronic device of claim 13, wherein the second processor is configured to determine whether to transmit at least one of the external data or the result of processing the external data if the external data or the result of processing the external data is related to the network registration state, the RAT information, or Network Identity and Time Zone (NITZ) information.

* * * * *